US006374217B1

United States Patent
Bellegarda

(10) Patent No.: US 6,374,217 B1
(45) Date of Patent: Apr. 16, 2002

(54) FAST UPDATE IMPLEMENTATION FOR EFFICIENT LATENT SEMANTIC LANGUAGE MODELING

(75) Inventor: Jerome R. Bellegarda, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/267,334

(22) Filed: Mar. 12, 1999

(51) Int. Cl.$^7$ .......................... G10L 15/14; G10L 15/18
(52) U.S. Cl. ...................................... 704/240; 704/257
(58) Field of Search ............................... 704/236, 240, 704/241, 242, 255–257, 275

(56) References Cited

U.S. PATENT DOCUMENTS

| | | | | |
|---|---|---|---|---|
| 5,621,859 A | | 4/1997 | Schwartz et al. | 395/2.65 |
| 5,712,957 A | | 1/1998 | Waibel et al. | 395/2.49 |
| 5,828,999 A | * | 10/1998 | Bellagarda et al. | 704/240 |
| 5,835,893 A | * | 11/1998 | Ushioda | 704/257 |
| 5,839,106 A | | 11/1998 | Bellegarda | 704/257 |
| 6,208,971 B1 | * | 3/2001 | Bellagarda et al. | 704/275 |

OTHER PUBLICATIONS

Bahl, L. et la., "A Maximum Likelihood Approach to Continuous Speech Recognition," IEEE Transactions on Pattern Analysis and Machine Intelligence, vol. PAMI–5, No. 2, Mar. 1993, pp. 179–190.
Bellegarda, J. et al., "A Novel Word Clustering Algorithm Based On Latent Semantic Analysis," IEEE International Conference on Acoustics, Speech, and Signal Processing Conference Proceedings, May 7–10, 1996, Marriott Marquis Hotel, Atlanta, GA., USA. pp. 172–175.
Bellegarda, J., "A Latent Semantic Analysis Framework For Large–Span Language Modeling," Proc. EuroSpeech '97 Rhodes, Greece, Sep. 1997, pp. 1451–1454.
Bellegarda, J., "A Multispan Language Modeling Framework for Large Vocabulary Speech Recognition," IEEE Transaction on Speech and Audio Processing, vol. 6, No. 5, Sep. 1998, pp. 456–467.
Katz, S., "Estimation of Probabilities from Sparse Data for the Language Model Component of a Speech Recognizer," IEEE Transactions on Acoustics, Speech, and Signal Processing Society, vol. ASSP–35, No. 3, Mar. 1987, pp. 400–401.

* cited by examiner

Primary Examiner—David D. Knepper
(74) Attorney, Agent, or Firm—Blakely, Sokoloff, Taylor & Zafman

(57) ABSTRACT

Speech or acoustic signals are processed directly using a hybrid stochastic language model produced by integrating a latent semantic analysis language model into an n-gram probability language model. The latent semantic analysis language model probability is computed using a first pseudo-document vector that is derived from a second pseudo-document vector with the pseudo-document vectors representing pseudo-documents created from the signals received at different times. The first pseudo-document vector is derived from the second pseudo-document vector by updating the second pseudo-document vector directly in latent semantic analysis space in response to at least one addition of a candidate word of the received speech signals to the pseudo-document represented by the second pseudo-document vector. Updating precludes mapping a sparse representation for a pseudo-document into the latent semantic space to produce the first pseudo-document vector. A linguistic message representative of the received speech signals is generated.

24 Claims, 5 Drawing Sheets

FAST UPDATE IMPLEMENTATION FOR EFFICIENT LATENT SEMANTIC LANGUAGE MODELING

FIELD OF THE INVENTION

The present invention relates to speech recognition and, more particularly, to language modeling in large-vocabulary speech recognition systems.

BACKGROUND OF THE INVENTION

Speech recognition is typically the process of converting an acoustic signal into a linguistic message. In certain applications, for example where a speech recognition processor serves as a user interface to a database query system, the resulting message may need to contain just enough information to reliably communicate a speaker's goal. However, in applications such as automated dictation or computer data entry, it may be critical that the resulting message represent a verbatim transcription of a sequence of spoken words. In either event, an accurate statistical, or stochastic, language model is desirable for successful recognition.

As described herein, stochastic language models are commonly used in speech recognition systems to constrain acoustic analyses, to guide searches through various text hypotheses, and to aid in the determination of final text transcriptions. Therefore, it is vital that a stochastic language model be easily implementable and highly reliable. Available language modeling techniques, however, have proven less than adequate for many real world applications. For example, while many existing models perform satisfactorily in small-vocabulary contexts in which the range of spoken words input to a recognition system is severely limited (e.g., to 1000 words or less), relatively few known models are even tractable in large-vocabulary contexts in which the range of possible spoken words is virtually unlimited (e.g., 20,000 words or more).

Traditionally, language models have relied upon the classic n-gram paradigm to define the probability of occurrence, within a spoken vocabulary, of all possible sequences of n words. Because it emphasizes word order, the n-gram paradigm is properly cast as a syntactic approach to language modeling. Also, because it provides probabilities for relatively small groups of words (i.e., n is typically less than the number of words in a sentence of average length), the n-gram paradigm is said to impose local language constraints on the speech recognition process.

Given a language model consisting of a set of a priori n-gram probabilities, a conventional speech recognition system can define a "most likely" linguistic output message based on an acoustic input signal. However, because the n-gram paradigm does not contemplate word meaning, and because limits on available processing and memory resources preclude the use of models in which n is made large enough to incorporate global language constraints, models based purely on the n-gram paradigm are not always sufficiently reliable. This is particularly true in modern, large-vocabulary applications.

Furthermore, an n-gram based model is only as reliable as are its underlying a priori probabilities, and such probabilities are often difficult to ascertain. Though they may be empirically estimated using relative frequency counts based on machine-readable training databases, constraints on the size of available databases often result in inaccurate approximations. As a result, various parameter estimation, smoothing, and class-based processing techniques have been developed. Broadly speaking, such techniques attempt to better estimate the conditional probability of a word, given a particular context, by also observing other words which are used similarly in the given context. Nonetheless, the limitations associated with presently available databases and computing resources still make it extremely difficult to go much beyond n<=4. Thus, even considering these improved estimation techniques, n-gram based systems offer limited success for today's large-vocabulary applications.

To circumvent the limitations associated with the n-gram paradigm, alternative language models have been developed. Rather than using brute force to incorporate global language constraints (i.e., making n larger in the n-gram paradigm), these alternative approaches use finesse to expand the effective context which is used in computing probabilities from just a few words to a much larger span (e.g., a sentence, a paragraph, or even an entire document). Typically, these techniques attempt to capture meaningful word associations within a more global language context. Thus, they represent a semantic approach to language modeling.

Known semantic approaches include formal parsing mechanisms and trigger pairs. However, while parsing techniques have proven useful in certain small-vocabulary recognition applications, they are as yet impractical for use in large-vocabulary systems. Additionally, trigger pairs have proven reliable in only a few limited circumstances. They remain impractical in most real world applications.

Improved semantic analysis techniques have been developed, some of which, for example, rely on latent semantic analysis. Generally, latent semantic analysis is a data-driven technique which, given a corpus of training text, describes which words appear in which global contexts (e.g., which documents). This allows words to be represented as vectors in a convenient vector space. However, the full power of latent semantic analysis has yet to be exploited. Furthermore, even though the various known semantic models may ultimately prove beneficial in certain applications, the inherent lack of tight local word order constraints in such models may ultimately prevent their widespread acceptance and use.

Stochastic language modeling plays a central role in large vocabulary speech recogniton, where it is typically used to constrain the acoustic analysis, guide the search through various (partial) text hypotheses, and contribute to the determination of the final transcription. A new class of statistical language models have been recently introduced that exploit both syntactic and semantic information. This approach embeds latent semantic analysis (LSA), which is used to capture meaningful word associations in the available context, into the standard n-gram paradigm, which relies on the probability of occurrence in the language of all possible strings of n words.

This new class of language models, referred to as integrated n-gram+LSA models, has resulted in a substantial reduction in perplexity. It was therefore anticipated that rescoring N-best lists with the integrated models would significantly improve recognition accuracy. Direct usage in earlier passes of the recogntion process, while typically more beneficial, was not considered realistic in this case due to the relatively high computational cost of the method. Indeed, in a typical large vocabulary search performed on an average sentence comprising several hundred frames, several thousand theories could be active at any given frame. Thus, the computational load is usually several orders of magnitude or greater than the simple post-search rescoring.

For LSA language modeling to be included inside the search, its computational cost must therefore be reduced accordingly. Thus, there is an immediate need for an improved approach to stochastic language modeling that would allow for direct use in the vocabulary search, particularly in the context of large-vocabulary speech recognition systems.

SUMMARY OF THE INVENTION

A method and apparatus for a fast update implementation for efficient latent semantic language modeling in a hybrid stochastic language model which seamlessly combines syntactic and semantic analyses is provided. Speech or acoustic signals are received, features are extracted from the signals, and an acoustic vector sequence is produced from the signals by a mapping from words and documents of the signals. The speech signals are processed directly using a language model produced by integrating a latent semantic analysis into an n-gram probability. The latent semantic analysis language model probability is computed using a first pseudo-document vector expressed in terms of a second pseudo-document vector. Expressing the first pseudo-document vector in terms of the second pseudo-document vector comprises updating the second pseudo-document vector directly in latent semantic analysis space in order to produce the first pseudo-document vector in response to at least one addition of a candidate word of the received speech signals. Updating precludes mapping the sparse representations for a current word and pseudo-document to vectors for a current word and pseudo-document for each addition of a candidate word of the received speech signals, wherein a number of computations of the processing are reduced by a value approximately equal to a vocabulary size. A linguistic message representative of the received speech signals is generated.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
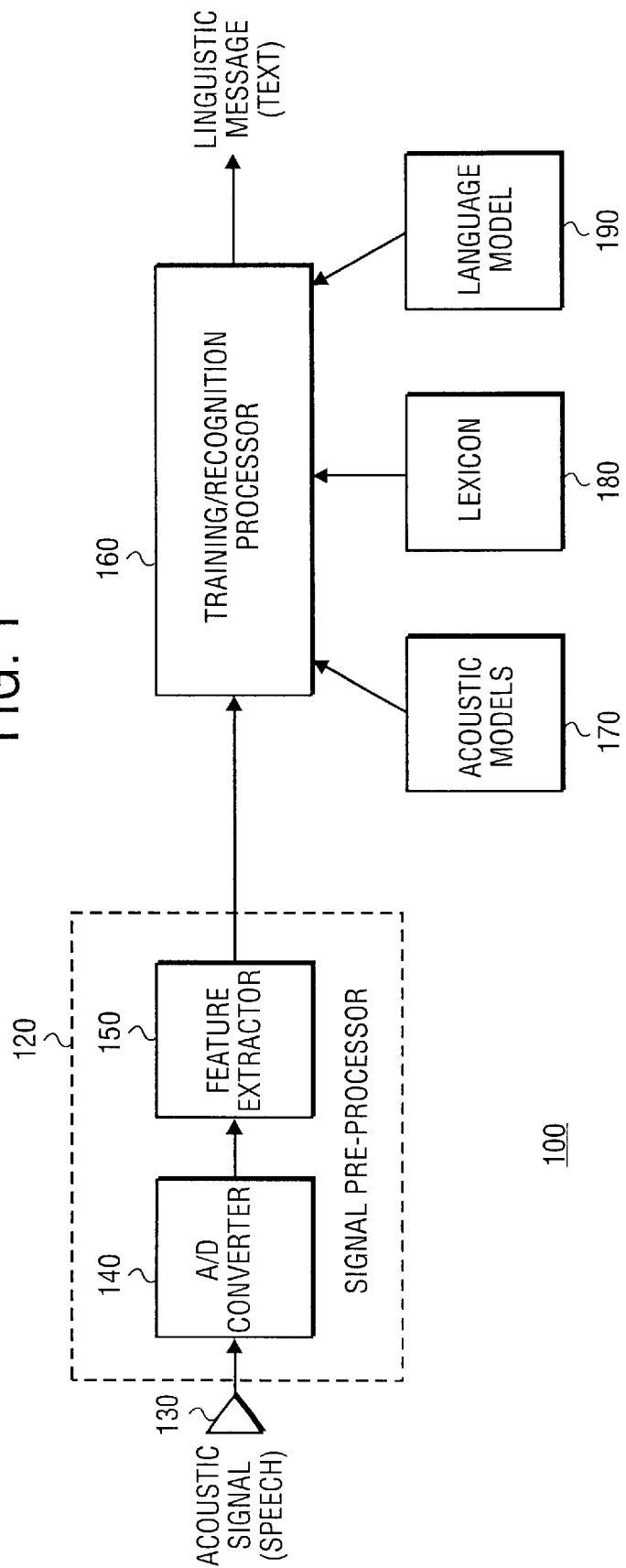
FIG. 1 is a speech recognition system of an embodiment of the present invention.

FIG. 1 is a speech recognition system 100 of an embodiment of the present invention comprising a transducer 130, a signal pre-processor 120, a recognition processor 160, an acoustic model 170, a lexicon 180, and a language model 190. The language model 190 of an embodiment of the present invention comprises latent semantic analysis (LSA), but the embodiment is not so limited. The signal pre-processor 120 includes an analog-to-digital (A/D) converter 140 and a feature extractor 150. An acoustic signal is input to the transducer 130, and an output of the transducer 130 is coupled to an input of the A/D converter 140. An output of the A/D converter 140 is in turn coupled to an input of the feature extractor 150, and an output of the feature extractor 150 is coupled to an input of the recognition processor 160. The recognition processor 160 receives input from a set of acoustic models 170, the lexicon 180, and the language model 190 and produces a linguistic message output.

Figure 2:
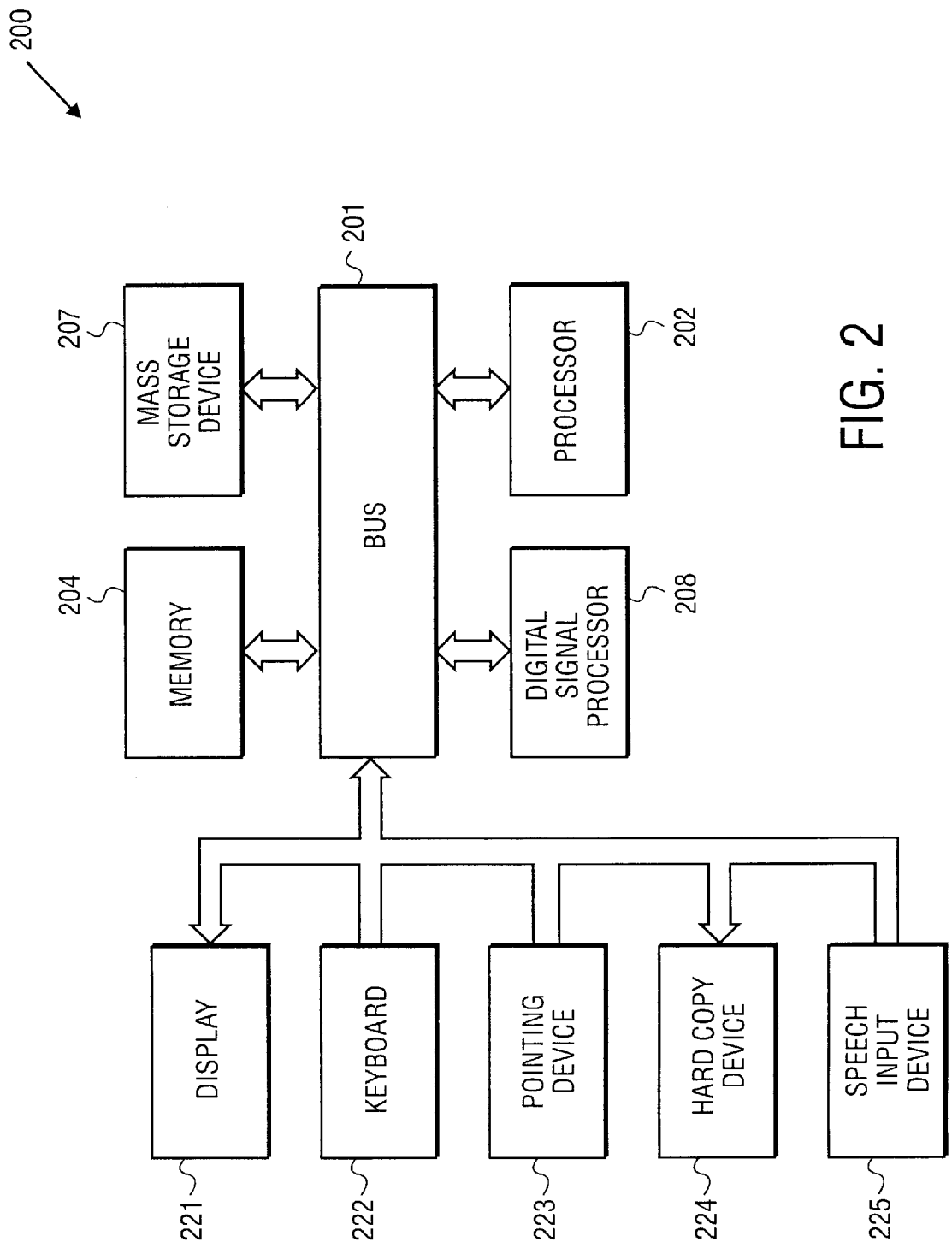
FIG. 2 is a computer system hosting a speech recognition system of an embodiment of the present invention.

FIG. 2 is a computer system 200 hosting the speech recognition system (SRS) of one embodiment. The computer system 200 comprises, but is not limited to, a system bus 201 that allows for communication among a processor 202, a digital signal processor 208, a memory 204, and a mass storage device 207. The system bus 201 is also coupled to receive inputs from a keyboard 222, a pointing device 223, and a speech signal input device 225, but is not so limited. The system bus 201 provides outputs to a display device 221 and a hard copy device 224, but is not so limited.

Figure 3:
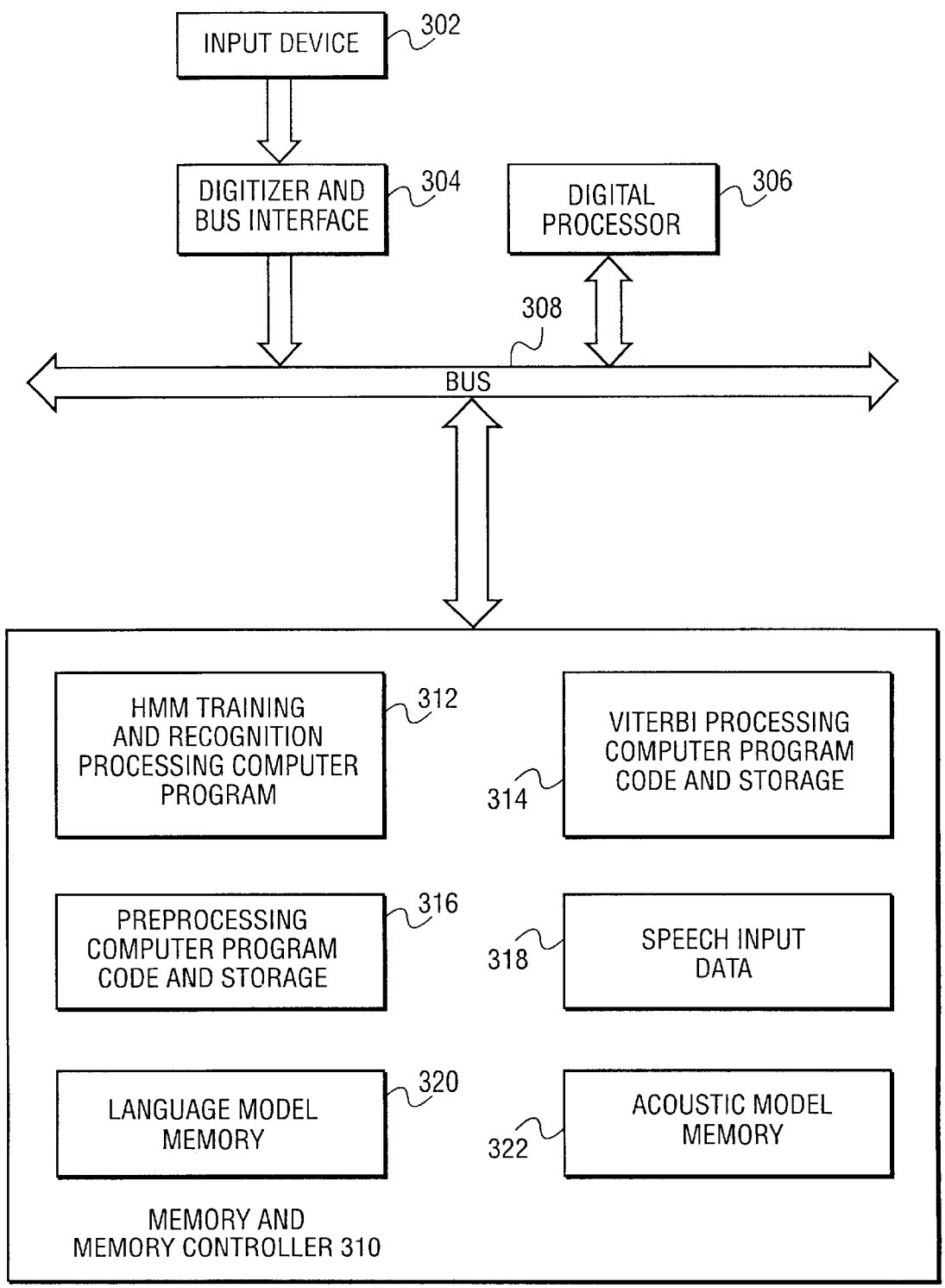
FIG. 3 is a computer system memory hosting a speech recognition system of an embodiment of the present invention.

FIG. 3 is the computer system memory 310 hosting the speech recognition system of one embodiment. An input device 302 provides speech signals to a digitizer and bus interface 304. The digitizer 304 samples and digitizes the speech signals for further processing. The digitizer and bus interface 304 allows for storage of the digitized speech signals in the speech input data memory component 318 of memory 310 via the system bus 308. The digitized speech signals are processed by a digital processor 306 using algorithms and data stored in the components 312–322 of the memory 310. As discussed herein, the algorithms and data that are used in processing the speech signals are stored in components of the memory 310 comprising, but not limited to, a hidden Markov model (HMM) training and recognition processing computer program 312, a viterbi processing computer program code and storage 314, a preprocessing computer program code and storage 316, language model memory 320, and acoustic model memory 322.

In the operation of an embodiment of the present invention, and with reference to FIG. 1, an acoustic speech signal is input to the system 100 using the transducer 130, which may be for example a microphone. A corresponding analog electrical signal, output by the transducer 130, is then converted to digital form by the A/D converter 140. The resulting digital speech samples are then processed in successive time intervals within the feature extractor 150, using conventional methods, to produce a sequence of acoustic feature vectors. The resulting feature vectors are optionally converted, using known vector quantization techniques, into a sequence of discrete feature code-words representative of various acoustic prototypes. The feature vectors, or code-words, are then transformed by the recognition processor 160 to produce an appropriate linguistic message output, but the embodiment is not so limited.

The recognition processor 160 utilizes the set of acoustic models 170, the lexicon 180, and the language model 190, in combination, to constrain and make workable the transformation process, but is not so limited. In brief, the set of acoustic models 170, (e.g., well known Hidden Markov Models) is used to evaluate the feature vectors output by the feature extractor 150 against basic units of speech, such as phonemes or allophones. The most likely basic units of speech are then processed, in accordance with information provided by the lexicon 180 and the language model 190, to generate the final linguistic message output.

The lexicon 180 of an embodiment defines the vocabulary of the recognition system 100 in terms of the basic speech elements (words), and the language model 190 defines allowable sequences of vocabulary items. As described above, the language model 190 may be a stochastic language model which provides a set of a priori probabilities, each probability indicating a likelihood that a given word may occur in a particular context. Such a set of a priori probabilities may be used, for example, to help search for and prioritize candidate output messages based on sequences of basic speech elements. Note, however, that the precise method by which the recognition processor 160 utilizes the language model 190 to create an output message from a sequence of basic speech units is not necessary for an understanding of the present invention as long as an LSA component is used at some point.

The language model 190 may be a single-span, or single-context, language model, wherein the language model 190 may be a syntactic model (e.g., an n-gram model), providing a set of a priori probabilities based on a local word context, or it may be a semantic model (e.g., a latent semantic model), providing a priori probabilities based on a global word context. Using a syntactic approach, the language model 190 provides a set of n-gram a priori probabilities, each of which defines the likelihood that a particular word within the system vocabulary (defined by the lexicon 180) will occur immediately following a string of n−1 words which are also within the system vocabulary. More concisely, the language model 190 provides, for each word $w_q$ in an available vocabulary V, a conditional probability $Pr(w_q|H_q^{(l)})$ that the word $w_q$ will occur given a local context, or history, $H_q^{(l)}$ consisting of a string of n−1 words $w_{q-1} w_{q-2} \ldots w_{q-n+1}$, as follows:

$$Pr(w_q|H_q^{(l)}) = Pr(w_q|w_{q-2} \ldots w_{q-n+1}). \quad (1)$$

Given a set of a priori probabilities defined in accordance with equation (1), the recognition processor 160 can search for, and assess the likelihood of, various text hypotheses in producing the output message. As is well known, the a priori probabilities $Pr(w_q|H_q^{(l)})$ can be estimated during a training phase using existing text databases. For example, the Linguistic Data Consortium sponsored by the Advanced Research Project Agency (ARPA) provides a wide range of application-specific databases which can be used for training purposes. As described above, however, unreliable estimates and a lack of global constraints render the local-span n-gram model impractical in many large-vocabulary applications.

In contrast to the n-gram approach, semantic analyses may provide single-span language models incorporating global constraints. For example, the language model 190 may provide a set of global conditional probabilities, each defining a likelihood that a particular word within the system vocabulary will occur given a specified global context. The global context might comprise, for example, documents selected from a set of training documents which are tailored, prior to recognition, to suit a particular application. Alternately, the global context might be dynamic with respect to the recognition process, comprising for example a relatively long (e.g., 1000-word) text message representing the most recent output of the recognition processor 160.

In concise terms, the latent semantic model provides, for every word $w_q$ in a system vocabulary V, a conditional probability $Pr(w_q|H_q^{(g)})$ that the word $w_q$ will occur given a global context, or history, $H_q^{(g)}$ consisting of a broad word span, or document, $d_q$, as follows:

$$Pr(w_q|H_q^{(g)}) = Pr(w_q|d_q) = \sum_{k=1}^{K} Pr(w_q|C_k) Pr(C_k|d_q). \quad (2)$$

In equation (2), $C_k$ denotes one of a set of K word clusters which span the underlying word/document space. These clusters can be interpreted as a convenient representation of the semantic events occurring in the training database. Thus, equation (2) translates the fact that the probability of a word depends on its importance relative to each semantic event as well as the importance of the semantic event itself. The intermediate probabilities $Pr(w_q|C_k)$ and $Pr(C_k|d_q)$ may be obtained using suitable multi-variate distributions, wherein such distributions are induced by appropriate distance measures defined in the vector space representation which results from the singular value decomposition framework of latent semantic analysis. As with the syntactic single-span model, the recognition processor 160 may employ a set of semantic a priori probabilities defined in accordance with equation (2) to search for and prioritize various text hypotheses when generating output messages. As described herein, however, this semantic single-span model does not incorporate potentially useful local language constraints. Advantageously, an embodiment of the present invention teaches that the problems described herein associated with conventional, single-span systems may be overcome by strategically integrating the beneficial features of both language model types. Therefore, the present invention teaches that it is possible to combine local constraints, such as those provided by the n-gram paradigm, with global constraints, such as those provided by a latent semantic model, to integrate both syntactic and semantic information into a single, hybrid language model.

Figure 4:
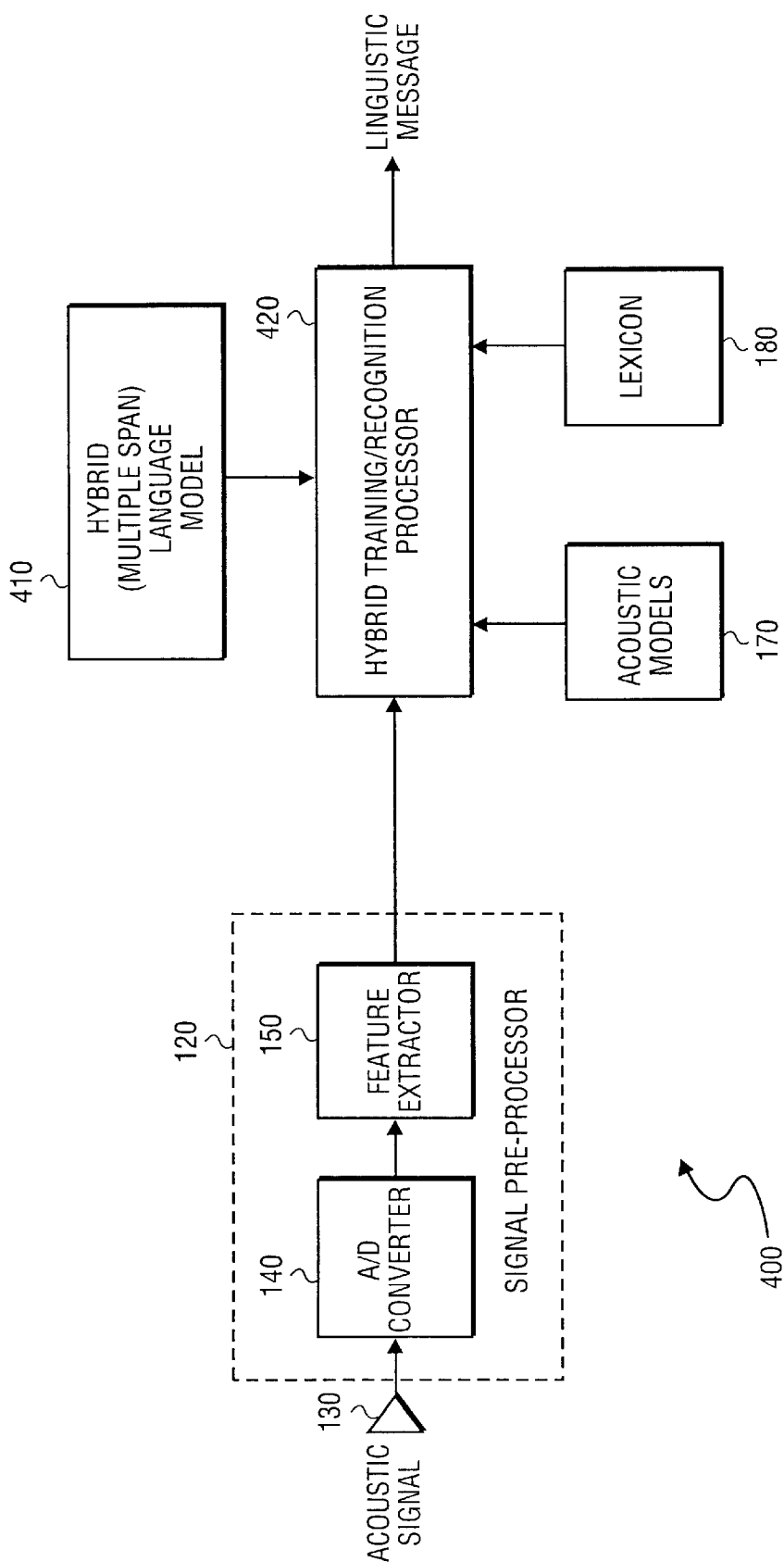
FIG. 4 is a speech recognition system of a preferred embodiment of the present invention.

FIG. 4 is a speech recognition system of a preferred embodiment of the present invention. The exemplary system 400 comprises a transducer 130, a signal pre-processor 120, a hybrid recognition processor 420, an acoustic model 170, a lexicon 180, and a hybrid, multiple-span language model 410. The signal pre-processor 120 of an embodiment comprises an analog-to-digital (A/D) converter 140 and a feature extractor 150, but is not so limited. An acoustic signal is input to the transducer 130, and an output of the transducer 130 is coupled to an input of the A/D converter 140. An output of the A/D converter 140 is in turn coupled to an input of the feature extractor 150, and an output of the feature extractor 150 is coupled to an input of the hybrid recognition processor 420. The hybrid recognition processor 420 receives input from the acoustic model 170, the lexicon 180, and the hybrid language model 410 and produces a linguistic message output.

In operation, the transducer 130, the signal pre-processor 120, the acoustic model 170, and the lexicon 180 function as described herein with respect to FIG. 1. However, in contrast to conventional processors, the hybrid processor 420 of an embodiment of the present invention carries out speech recognition using a hybrid language model 410 which combines local and global language constraints to realize both syntactic and semantic modeling benefits. The hybrid processing of an embodiment of the present invention, in contrast to typical approaches carried out using a two-pass approach, is computed in a single recognition pass using an integrated model with the fast update implementation of the present invention. Therefore, the fast update implementation for efficient latent semantic language modeling, by reducing the number of calculations necessary to perform recognition, eliminates the necessity of using a two-pass approach requiring a first pass to generate a first set of likelihoods, or scores, for a group of "most likely" candidate output messages and a second pass to process the first set of scores and produce a second set of improved, hybrid scores.

As described herein, one single-span paradigm is made subordinate to another by making appropriate assumptions with respect to conditional probabilities which are used to construct the composite, multi-span paradigm. Conceptually, subordinating the n-gram paradigm to the latent semantic paradigm amounts to driving the recognition process using global constraints while fine-tuning it using local constraints. On the other hand, subordinating the latent semantic paradigm to the n-gram paradigm yields a recognition process which proceeds locally while taking global constraints into account.

In an exemplary embodiment, latent semantic analysis is subordinated to the n-gram paradigm to effectively integrate semantic information into a search that is primarily syntactically driven. The resulting language model is therefore properly described as a modified n-gram incorporating large-span semantic information.

In accordance with the exemplary embodiment, an integrated paradigm is defined by computing a conditional probability $Pr(w_q|H_q^{(h)})$ that a particular word $w_q$ will occur, given a hybrid history $H_q^{(h)}$ comprising a local history $H^{(l)}$ and a global history $H^{(g)}$. The local history $H^{(l)}$ includes a string of n−1 words $w_{q-1}w_{q-2} \ldots w_{q-n+1}$ as is described above with respect to the n-gram paradigm, and the global history $H^{(g)}$ includes a broad word span, or document, $d_q$ as is described above with respect to latent semantic analysis. Such a composite conditional probability can be written, generally, as follows:

$$Pr(w_q|H_q^{(h)}) = Pr(w_q|H_q^{(l)}, H_q^{(g)}) = Pr(w_q|w_{q-1}w_{q-2} \ldots w_{q-n+1}, d_q) \quad (3)$$

By definition, the conditional probability $Pr(w_q|H_q^{(h)})$ that a particular word $w_q$ will occur, given an immediate context $w_{q-1}w_{q-2} \ldots w_{q-n+1}$ and a relevant document $d_q$, can be computed explicitly by dividing the probability of the particular word $w_q$ and the document $d_q$, given the immediate context $w_{q-1}w_{q-2} \ldots w_{q-n+1}$, by a summation which includes, for every individual word $w_i$ in the system vocabulary V, the probability of the individual word $w_i$ and the document $d_q$, given the immediate context $w_{q-1}w_{q-2} \ldots w_{q-n+1}$ of the particular word $w_q$. In other words, the composite conditional probability can be written as follows:

$$Pr(w_q|H_q^{(h)}) = \frac{Pr(w_q, d_q | w_{q-1}w_{q-2} \ldots w_{q-n+1})}{\sum_{w_i \in V} Pr(w_i, d_q | w_{q-1}w_{q-2} \ldots w_{q-n+1})} \quad (4)$$

According to the exemplary embodiment, it is assumed that the probability of the particular word $w_q$, given the relevant document $d_q$ for the word $w_q$, is independent of the immediate context $w_{q-1}w_{q-2} \ldots w_{q-n+1}$ of the word $w_q$. This is a reasonable assumption given that different syntactic constructs are often used in a language to carry the same meaning. Thus, the probability of the particular word $w_q$ and the document $d_q$, given the immediate context $w_{q-1}w_{q-2} \ldots w_{q-n+1}$, can be computed as a product of the probability of the particular word $w_q$, given the document $d_q$, and the probability of the document $d_q$, given the immediate context $w_{q-1}w_{q-2} \ldots w_{q-n+1}$. Therefore, the numerator of equation (4) can be expanded as:

$$Pr(w_q, d_q | w_{q-1}w_{q-2} \ldots w_{q-n+1}) = Pr(w_q|d_q)Pr(d_q|w_{q-1}w_{q-2} \ldots w_{q-n+1}) \quad (5)$$

According to the exemplary embodiment, it is also assumed that the probability of the relevant document $d_q$ for the particular word $w_q$, given the immediate context $w_{q-1}w_{q-2} \ldots w_{q-n+1}$ of the word $w_q$, is equal to the probability of the word $w_q$, given its immediate context $w_{q-1}w_{q-2} \ldots w_{q-n+1}$. Such an assumption effectively subordinates the latent semantic model to the n-gram paradigm. In other words, the assumption is that, on the basis of just the immediate context $w_{q-1}w_{q-2} \ldots w_{q-n+1}$, the only prediction that can be made with respect to the relevant document $d_q$ is a prediction of the word $w_q$ itself. Thus, the probability of the particular word $w_q$ and the document $d_q$, given the immediate context $w_{q-1}w_{q-2} \ldots w_{q-n+1}$, can be computed more simply as a product of the probability of the particular word $w_q$, given the document $d_q$, and the probability of the particular word $w_q$, given the immediate context $w_{q-1}w_{q-2} \ldots w_{q-n+1}$. Therefore, equation (5) can be simplified as:

$$Pr(w_q, d_q | w_{q-1}w_{q-2} \ldots w_{q-n+1}) = Pr(w_q|d_q)Pr(w_q|w_{q-2} \ldots w_{q-n+1}) \quad (6)$$

Thus, according to the exemplary embodiment, a composite conditional probability is computed by dividing the product of the probability of the particular word $w_q$, given the document $d_q$, and the probability of the particular word $w_q$, given the immediate context $w_{q-1}w_{q-2} \ldots w_{q-n+1}$, by a summation which includes, for every individual word $w_i$ in the system vocabulary V, a product of the probability of the individual word $w_i$, given the document $d_q$, and the probability of the individual word $w_i$, given the immediate context $w_{q-1}w_{q-2} \ldots w_{q-n+1}$ of the particular word $w_q$. Such a composite probability can be written compactly as:

$$Pr(w_q | H_q) = \frac{Pr(w_q | w_{q-1}w_{q-2} \ldots w_{q-n+1})Pr(w_q d_q)}{\sum_{w_i \in V} Pr(w_i | w_{q-1}w_{q-2} \ldots w_{q-n+1})Pr(w_i | d_q)}, \quad (7)$$

According to the exemplary embodiment, the composite conditional probability is then used as an integrated paradigm to achieve single-pass recognition in an embodiment of the present invention. Consequently, integrated a priori probabilities are computed using the composite conditional probability formula, and the integrated a priori probabilities are used to search for and prioritize candidate linguistic messages. Note that, advantageously, each element of the integrated paradigm can be computed in a straightforward manner according to the n-gram and latent semantic paradigms described above. Thus, the integrated paradigm of the exemplary embodiment is easily implemented using available resources.

Note also that the exemplary integrated paradigm can be interpreted in the context of Bayesian estimation. Therefore, if the conditional probability $Pr(w_q|d_q)$ of a particular word $w_q$ given a global context $d_q$ is viewed as a prior probability for the word $w_q$, then the composite conditional probability computed above represents a translation of the classical Bayesian estimator of the n-gram (local) probability using a prior distribution obtained from (global) latent semantic analysis. As such, equation (7) can be interpreted as an operation which multiplies an n-gram probability by a conditional probability $Pr(w_q|d_q)$ and then renormalizes the resulting product to produce a proper probability, which is analogous to Bayesian estimation. Thus, there exists a rigorous framework for justifying the assumptions made above.

As discussed herein, rescoring N-best lists with the integrated models of an embodiment of the present invention significantly improves recognition accuracy. Direct usage in earlier passes of the recognition process, while typically more beneficial, was not heretofore considered realistic because of the relatively high computational cost of the method, as the computational load is typically several orders of magnitude greater than the simple post-search rescoring. As such, an embodiment of the present invention reduces the computational cost so that LSA language modeling can be included inside the search.

In describing the fast update implementation used in an embodiment of the present invention to reduce the computational cost, let $V, |V|=M$, be some vocabulary of interest and T a training text corpus, i.e., a collection of N articles (documents) from a variety of sources. Typically, M and N are on the order of ten and hundred thousand, respectively; T might comprise a couple hundred million words, but the embodiment is not so limited. The LSA approach defines a mapping between the sets V and T and a vector space s, whereby each word $w_j$ in V and each document $d_j$ in T is represented by a vector in S. This mapping follows from the singular value decomposition (SVD) of the matrix of co-occurences between words and docuements. The (m×n) word documents matrix of an embodiment is denoted as W. Then $$W \approx \hat{W} = USV^T, \quad (8)$$

where U is the (M×R) matrix of left singular vectors $u_i (1 \leq i \leq M) u_i$, S is the (R×R) diagonal matrix of singular values, V is the (N×R) matrix of right singular vectors $v_j (1 \leq j \leq N), R << M(<<N)$ is the order of the decomposition, and $^T$ denotes matrix transposition. The ith left singular vector $u_i$ can be viewed as the representation of the ith word $w_i$ in a vector space of dimension R. Similarly, the jth right singular vector $v_j$ can be viewed as the representation of the jth document $d_j$ in the same vector space of dimension R. Thus, the space S sought is the space spanned by the left and right singular vectors. The equations $$u_i = w_i V S^{-1}, \quad (9)$$

and $$v_j = d_j^T U S^{-1}, \quad (10)$$

express the mapping from words and documents to vectors, respectively.

$$Pr(w_q | H_{q-1}^{lsa}) = Pr(w_q | \tilde{d}_{q-1}), \quad (11)$$

where $w_q$ is the current word and $H_{q-1}^{(isa)}$ is the associated history for this word, i.e., the current document so far (also referred to as the current pseudo-document). This is done in three steps comprising, but not limited to: (i) construct sparse representations $w_q$ and $\tilde{d}_{q-1}$ for the current word and pseudo-document, (ii) use equations 9 and 10 to map these quantities to vectors $u_q$ and $\tilde{v}_{q-1}$ in the space S, and (iii) use a suitable measure in S to evaluate the closeness between $u_q$ and $\tilde{v}_{q-1}$. In the standard implementation, the mapping of equation 2 is pre-computed as part of the SVD decomposition. The mapping of equation 3, however, requires O (M R) floating point operations each time it is envoked.

An embodiment of the present invention uses a fast update implementation that exploits the sequential nature of pseudo-documents for a fast update algorithm. In particular, as each theory is expanded, the document context remains largely unchanged, with only the most recent candidate word added. Taking advantage of this fact allows the new pseudo-document vector to be expressed directly in terms of the old pseudo-document vector, instead of each time re-computing the mapping from scratch.

As discussed herein, the word-document matrix W is a matrix of elements $w_i^j$, where $W_i^j$ represents the weighted count of word $w_i$ in document $d_j$. Among other possibilities, this weighted count may be expressed as $$W_i^j = g_i \frac{c_i^j}{n_j}. \quad (12)$$

where $g_i$ is the normalized entropy complement of $w_i$ in the corpus T, $c_i^j$ is the number of times $w_i$ occurs in document $d_j$ and $n_j$ is the total number of words present in document $d_j$. Accordingly, the current pseudo-document $d_{q-1}$ can be constructed as $$\tilde{d}_{q-1} = [W_1^{q-1} W_2^{q-1} \ldots W_i^{q-1} \ldots W_M^{q-1}]^T, \quad (13)$$

where we have made the implicit assumption that the training corpus T is large enough, so that the normalized entropy complement does not change appreciably with the addition of the pseudo-document.

In evaluating the difference between $\tilde{d}_{q-1}$ and $\tilde{d}_q$, assume without loss of generality, that the word $w_i$ is observed at the time q. Then, for $1 \leq k \leq M$, $k \neq i$, $$W_k^q = \frac{n_q - 1}{n_q} W_k^{q-1} \quad (14)$$

while, for k=i:

$$W_i^q = g_i \frac{c_i^{q-1} + 1}{n_q} = \frac{n_q - 1}{n_q} W_i^{q-1} + \frac{g_i}{n_q}. \quad (15)$$

Hence, with the shorthand notation $\gamma_i^q = g_i / n_q$, we can express $\tilde{d}_q$ as $$\tilde{d}_q = \frac{n_q - 1}{n_q} \tilde{d}_{q-1} + [0 \ldots \gamma_i^q \ldots 0]^T, \quad (16)$$

which in turn implies, from equation 10 that $$\tilde{v}_q = \frac{n_q - 1}{n_q} \tilde{v}_{q-1} + \gamma_i^q u_i S^{-1}. \quad (17)$$

Note that equation 17 requires only O (R) floating point operations. Thus, the pseudo-document vector can be updated directly in the LSA space at a fraction of the computational cost typically required to map the sparse representation to the space S.

Figure 5:
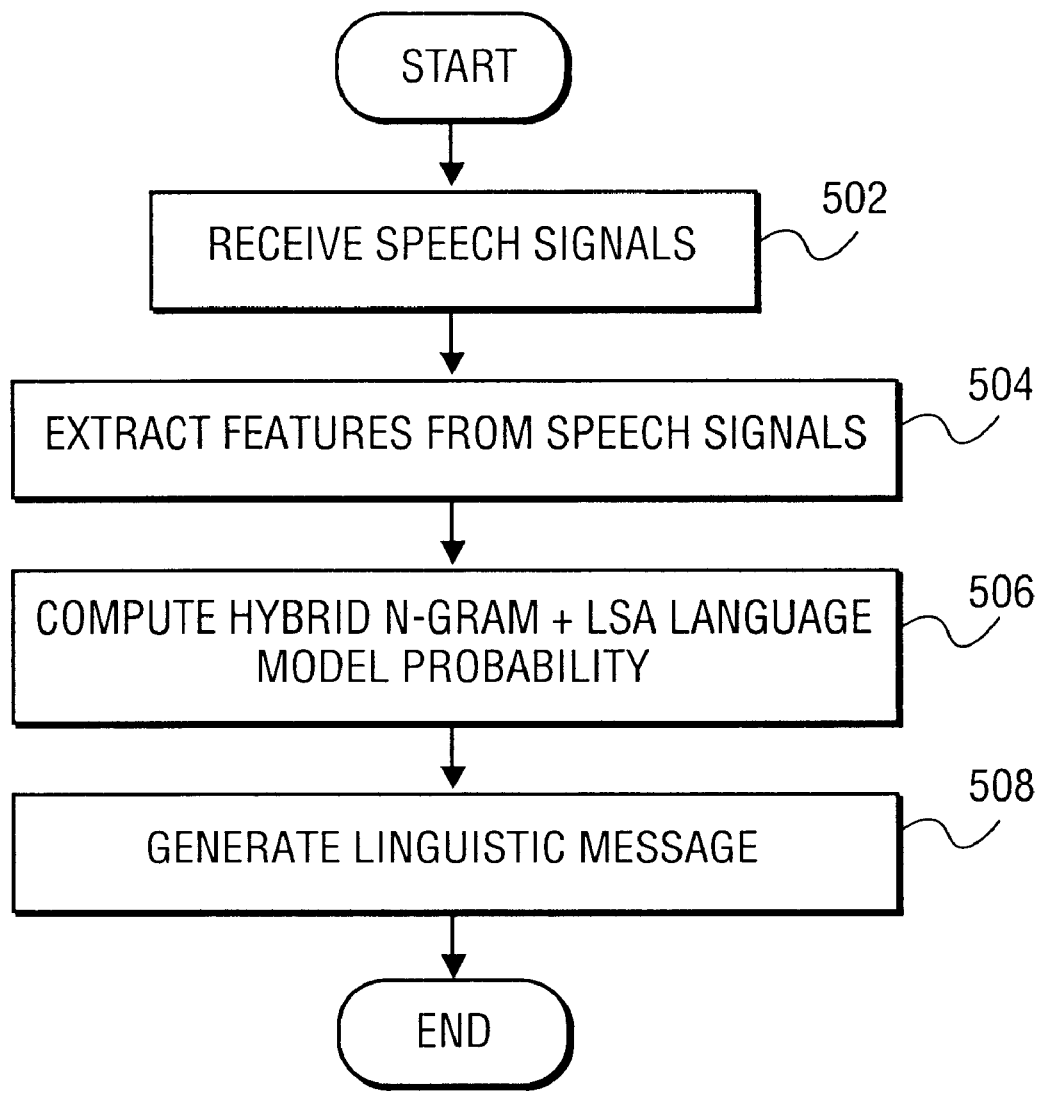
FIG. 5 is a flowchart for a speech recognition system comprising a fast update implementation for efficient latent semantic language modeling of an embodiment of the present invention.

FIG. 5 is a flowchart for speech recognition using a fast update implementation for efficient latent semantic language modeling of an embodiment of the present invention. Operation begins at step 502, at which speech or acoustic signals are received. Features are extracted from the speech signals, at step 504, and an acoustic vector sequence is produced from the received speech signals by a mapping from words and documents of the received speech signals. The speech signals are processed directly using a language model produced by integrating a latent semantic analysis into an n-gram probability. The hybrid n-gram plus latent semantic analysis language model probability is computed, at step 506, using a first pseudo-document vector expressed in terms of a second pseudo-document vector. Expressing the first pseudo-document vector in terms of the second pseudo-document vector comprises updating the second pseudo-document vector directly in latent semantic analysis space in order to produce the first pseudo-document vector in response to at least one addition of a candidate word of the received speech signals. Updating precludes mapping the sparse representations for a current word and pseudo-document to vectors for a current word and pseudo-document for each addition of a candidate word of the received speech signals, wherein a number of computations of the processing are reduced by a value approximately equal to a vocabulary size. Computation of the probability is accomplished by constructing sparse representations for a current word and pseudo-document, mapping the sparse representations for a current word and pseudo-document to vectors for a current word and pseudo-document, and evaluating the closeness between the vectors for a current word and pseudo-document. A linguistic message representative of the received speech signals is generated, at step 508.

Preliminary experiments were conducted on a subset of the Wall Street Journal 20,000 word-vocabulary continuous speech task. The acoustic training corpus consisted of 7,200 sentences of data uttered by 84 different native speakers of English. The language model training corpus was the ARPA North American Business (NAB) News corpus. The recognition system implementation a standard synchronous tree search using the integrated bigram+LSA language model of an embodiment of the present invention. This system was tested on twelve additional native speakers of English, who uttered a total of 478 test sentences. Had the integrated language model been applied at every frame for every theory, this experiment would have taken more than 25 years to complete on a cluster of multi-processor Sun SPARC station 10 workstations. The fast update implementation of an embodiment of the present invention, as described herein, saved approximately 4 orders of magnitude worth of computations (roughly the size of the vocabulary, M=20,000). As a result, it was possible to conduct the experiment overnight.

Thus, a fast update implementation for efficient latent semantic language modeling is provided for a speech recognition system that uses a large-vocabulary language model in which the local constraints of an n-gram paradigm are seamlessly and beneficially combined with the global constraints of latent semantic analysis. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for performing speech recognition comprising:
    receiving speech signals;
    processing the received speech signals directly using a language model produced by integrating a latent semantic analysis language model into an n-gram probability language model, wherein the latent semantic analysis language model probability is computed using a first pseudo-document vector derived from a second pseudo-document vector, the first and second pseudo-document vectors representing pseudo-documents created from the received speech signals at different points in time; and
    generating a linguistic message representative of the received speech signals.

2. The method of claim 1, wherein deriving the first pseudo-document vector from the second pseudo-document vector comprises updating the second pseudo-document vector directly in latent semantic analysis space in response to at least one addition of a word of the received speech signals to the pseudo-document represented by the second pseudo-document vector.

3. The method of claim 1, further comprising producing an acoustic vector sequence from the received speech signals by a mapping from words of the received speech signals.

4. The method of claim 1, wherein processing further comprises computing the latent semantic analysis language model probability by:
    constructing a sparse representation for a current word;
    mapping the sparse representation for the current word to a vector for the current word; and
    evaluating the closeness between the vector for the current word and the first pseudo-document vector.

5. The method of claim 4, wherein the mapping follows from a singular value decomposition of a matrix of co-occurrences between at least one word and at least one document.

6. The method of claim 2, wherein updating precludes mapping a sparse representation for a pseudo-document into the latent semantic analysis space to produce the first pseudo-document vector, wherein a number of computations of the processing are reduced by a value approximately equal to a vocabulary size.

7. A method for generating a language model for use in a speech recognition system, the method comprising integrating a latent semantic analysis language model into an n-gram probability language model, wherein the latent semantic analysis language model probability is computed using a first pseudo-document vector derived from a second pseudo-document vector, the first and second pseudo-document vectors representing pseudo-documents created from the received speech signals at different points in time.

8. The method of claim 7, wherein deriving the first pseudo-document vector from the second pseudo-document vector comprises updating the second pseudo-document vector directly in latent semantic analysis space in response to at least one addition of a candidate word of the received speech signals to the pseudo-document represented by the second pseudo-document vector.

9. The method of claim 8, wherein updating precludes mapping a sparse representation for a pseudo-document into the latent semantic analysis space to produce the first pseudo-document vector.

10. A speech recognition process comprising a statistical learning technique that uses a language model, the language model produced by integrating a latent semantic analysis language model into an n-gram probability language model, wherein the latent semantic analysis language model probability is computed using a first pseudo-document vector derived from a second pseudo-document vector, the first and second pseudo-document vectors representing pseudo-documents created from the received speech signals at different points in time.

11. The speech recognition process of claim 10, wherein deriving the first pseudo-document vector from the second pseudo-document vector comprises updating the second pseudo-document vector directly in latent semantic analysis space in response to at least one addition of a candidate word of the received speech signals to the pseudo-document represented by the second pseudo-document vector.

12. The speech recognition process of claim 11, wherein updating precludes mapping a sparse representations for a pseudo-document into the latent semantic analysis space to produce the first pseudo-document vector.

13. An apparatus for speech recognition comprising:

at least one processor;

an input coupled to the at least one processor, the input capable of receiving speech signals, the at least one processor configured to recognize the received speech signals using a language model produced by integrating a latent semantic analysis language model into an n-gram probability language model, wherein the latent semantic analysis language model probability is computed using a first pseudo-document vector derived from a second pseudo-document vector, the first and second pseudo-document vectors representing pseudo-documents created from the received speech signals at different points in time; and an output coupled to the at least one processor, the output capable of providing a linguistic message representative of the received speech signals.

14. The apparatus of claim 13, wherein deriving the first pseudo-document vector from the second pseudo-document vector comprises updating the second pseudo-document vector directly in latent semantic analysis space in response to at least one addition of a candidate word of the received speech signals to the pseudo-document represented by the second pseudo-document vector.

15. The apparatus of claim 13, wherein the at least one processor is further configured to produce an acoustic vector sequence from the received speech signals by a mapping from words of the received speech signals.

16. The apparatus of claim 13, wherein the processor is further configured to compute the latent semantic analysis language model probability by:

constructing a sparse representation for a current word;

mapping the sparse representation for the current word to a vector for the current word; and evaluating the closeness between the vector for the current word and the first pseudo-document vector.

17. The apparatus of claim 16, wherein the mapping follows from a singular value decomposition of a matrix of co-occurrences between at least one word and at least one document.

18. The apparatus of claim 14, wherein updating precludes mapping a sparse representation for a pseudo-document into the latent semantic analysis space to produce the first pseudo-document vector, wherein a number of computations of the processing are reduced by a value approximately equal to a vocabulary size.

19. A computer readable medium containing executable instructions which, when executed in a processing system, causes the system to perform a method for recognizing speech, the method comprising:

receiving speech signals;

processing the received speech signals directly using a language model produced by integrating a latent semantic analysis language model into an n-gram probability language model, wherein the latent semantic analysis language model probability is computed using a first pseudo-document vector derived from a second pseudo-document vector, the first and second pseudo-document vectors representing pseudo-documents created from the received speech signals at different points in time; and generating a linguistic message representative of the received speech signals.

20. The computer readable medium of claim 19, wherein deriving the first pseudo-document vector from the second pseudo-document vector comprises updating the second pseudo-document vector directly in latent semantic analysis space in order in response to at least one addition of a candidate word of the received speech signals to the pseudo-document represented by the second pseudo-document vector.

21. The computer readable medium of claim 19, wherein the method further comprises producing an acoustic vector sequence from the received speech signals by a mapping from words of the received speech signals.

22. The computer readable medium of claim 19, wherein processing further comprises computing the latent semantic analysis language model probability by:

constructing a sparse representation for a current word;

mapping the sparse representation for the current word to a vector for the current word; and evaluating the closeness between the vector for the current word and the first pseudo-document vector.

23. The computer readable medium of claim 22, wherein the mapping follows from a singular value decomposition of a matrix of co-occurrences between at least one word and at least one document.

24. The computer readable medium of claim 20, wherein updating precludes mapping a sparse representation for a pseudo-document into the latent semantic analysis space to produce the first pseudo-document vector, wherein a number of computations of the processing are reduced by a value approximately equal to a vocabulary size.

* * * * *